US010210205B1

(12) United States Patent
Chandrashekar et al.

(10) Patent No.: US 10,210,205 B1
(45) Date of Patent: Feb. 19, 2019

(54) SYSTEM INDEPENDENT CONFIGURATION MANAGEMENT DATABASE IDENTIFICATION SYSTEM

(71) Applicant: ServiceNow, Inc., Santa Clara, CA (US)

(72) Inventors: Sridhar Chandrashekar, Sammamish, WA (US); Arne M. Josefsberg, Medina, WA (US); James J. Pitts, Kirkland, WA (US); Chinna Babu Polinati, Snoqualmie, WA (US)

(73) Assignee: ServiceNow, Inc., Santa Clara, CA (US)

( * ) Notice: Subject to any disclaimer, the term of this patent is extended or adjusted under 35 U.S.C. 154(b) by 456 days.

(21) Appl. No.: 14/985,714

(22) Filed: Dec. 31, 2015

Related U.S. Application Data

(60) Provisional application No. 62/098,417, filed on Dec. 31, 2014.

(51) Int. Cl.
*G06F 17/30* (2006.01)

(52) U.S. Cl.
CPC .... *G06F 17/30442* (2013.01); *G06F 17/3056* (2013.01); *G06F 17/30864* (2013.01)

(58) Field of Classification Search
CPC .............................................. G06F 17/30442
See application file for complete search history.

(56) References Cited

U.S. PATENT DOCUMENTS

| 2006/0064486 | A1* | 3/2006 | Baron | H04L 41/0886 709/224 |
| 2009/0313219 | A1* | 12/2009 | Gupta | G06Q 10/10 |
| 2011/0012902 | A1* | 1/2011 | Rajagopalan | G06F 11/32 345/440 |

(Continued)

OTHER PUBLICATIONS

Uniform Resource Identifier, from Wikipedia, the free encyclopedia, retrieved from https://en.wikipedia.org/w/index.php?title=Uniform_Resource_Identifier&oldid=698313540, downloaded Jan. 5, 2016, 9 pp.

(Continued)

*Primary Examiner* — Syed H Hasan
(74) *Attorney, Agent, or Firm* — Fletcher Yoder PC

(57) ABSTRACT

Disclosed herein are various systems, methods, and apparatuses for providing a system independent Configuration Management Database identification system. In an implementation, a dynamic identification system correlates records of an originating system with records of an Authoritative Configuration Management Database (CMDB) including a set of one or more identifying rules that define a minimum amount of information in order to generate an identifying signature that serves as a common reference between a record of the originating system with a matching Configuration Item (CI) record of the ACMDB, receiving, from the originating system, information to generate an identifying signature, determining that the generated first identifying signature matches a stored identifying signature, and correlating the first record of the originating system (Continued)

corresponding with the generated first identifying signature with the one of the CI records of the ACMDB corresponding with the matching one of the identifying signatures.

17 Claims, 7 Drawing Sheets

(56) References Cited

U.S. PATENT DOCUMENTS

| | | | | |
|---|---|---|---|---|
| 2011/0082920 | A1* | 4/2011 | Bhattacharya | G06F 9/5072 709/221 |
| 2011/0295898 | A1* | 12/2011 | Grabarnik | G06Q 10/103 707/780 |
| 2011/0314050 | A1* | 12/2011 | Matsubara | G06F 17/30566 707/769 |
| 2012/0030671 | A1* | 2/2012 | Matsubara | H04L 67/34 718/1 |
| 2014/0032872 | A1* | 1/2014 | Vasavi | G06F 3/0605 711/172 |
| 2014/0325290 | A1* | 10/2014 | Gutjahr | G06F 11/079 714/48 |
| 2015/0304169 | A1* | 10/2015 | Milman | G06F 21/60 709/220 |
| 2016/0098428 | A1* | 4/2016 | Dolega | G06F 17/30292 707/803 |
| 2017/0134226 | A1* | 5/2017 | Ilic | H04L 41/0816 |

OTHER PUBLICATIONS

Domain Name System, from Wikipedia, the free encyclopedia, retrieved from https://en.wikipedia.org/w/index.php?title=Domain_Name_System&oldid=697535415, downloaded Jan. 5, 2016, 18 pp.

Master Data Management, from Wikipedia, the free encyclopedia, retrieved from https://en.wikipedia.org/w/index.php?title=Master_data_management&oldid=694808777, downloaded Jan. 5, 2016, 5 pp.

Federated Database System, from Wikipedia, the free encyclopedia, retrieved from https://en.wikipedia.org/w/index.php?title=Federated_database_system&oldid=694197805, downloaded Jan. 5, 2016, 6 pp.

* cited by examiner

# SYSTEM INDEPENDENT CONFIGURATION MANAGEMENT DATABASE IDENTIFICATION SYSTEM

CROSS REFERENCE TO RELATED APPLICATIONS

The present application claims the benefit of U.S. Provisional Application No. 62/098,417, filed Dec. 31, 2014, entitled, "System Independent Configuration Management Database Identification System," herein incorporated by reference.

TECHNICAL FIELD

This disclosure relates to the field of information technology (IT), and more specifically to a system independent Configuration Management Database identification system.

BACKGROUND

A Configuration Management Database (CMDB) provides a single system for IT information such as information about the hardware and infrastructure elements that participate in the delivery of IT services in support of a business operating model. A CMDB helps organizations better understand their IT environment by, for example, providing insight on incidents, problems, changes, and other information (e.g., financial resources, service availability, capacity management, etc.). A CMDB allows IT information for an organization to be stored and managed which permits reduction and duplication of effort and cost, improves information accuracy, and accelerates process execution. The CMDB includes a collection of Configuration Items (CIs) which represent the various elements of the IT environment and the relationships between those CIs. For example, a CI may represent a physical entity such as a computer or router, a logical entity such as an instance of a database, or a conceptual entity such as a requisition service. CIs in a CMDB can have multiple relationships to other CIs, users, and/or groups.

SUMMARY

Disclosed herein are implementations of systems, methods, and apparatuses for providing a system independent Configuration Management Database identification system.

According to an implementation, provided is a computer-implemented method in a dynamic identification system for operation of a network utilizing an Authoritative Configuration Management Database (ACMDB) comprising configuration item records, one of the item records comprising data related to an element in an information technology system, the method comprising transmitting, to the originating system over a network via a network port connected to the network, an identifying rule set that defines a minimum amount of data in order to generate an identifying signature that serves as a common reference between a record of the originating system with a matching Configuration Item (CI) record of the ACMDB, wherein the originating system includes a plurality of records to be associated with a plurality of CI records in the ACMDB, receiving, from the originating system via the network port, at least the minimum amount of data for a first record of the originating system that is defined as being necessary in order to generate an identifying signature, generating, using a processor, based at least on the received minimum amount of data for the first record, a generated first identifying signature, matching, using the processor, the generated first identifying signature with a matching stored identifying signature stored in a memory comprising an identification signature store comprising a plurality of stored identifying signatures that have been previously generated for a plurality of CI records of the ACMDB, creating a correlated first record, using the processor, by correlating the first record of the originating system corresponding with the generated first identifying signature with a CI record of the ACMDB corresponding with the matching stored identifying signature, outputting, at the network port, the correlated first record to a CMDB-supported activity system.

According to another implementation, an apparatus is provided that is used for network-based discovery of resources on a computer network, comprising a network interface comprising a first interface to an Authoritative Configuration Management Database (ACMDB) comprising a plurality of Configuration Item (CI) records, one of the CI records comprising data related to a physical machine in an information technology system, a second interface to a plurality of originating systems that each include a plurality of originating system records, wherein each one of the plurality of originating system records includes an n-tuple of properties, a processor, a CI record correlator comprising instructions executable by the processor and stored in a memory that correlates the plurality of originating system records of the plurality of originating systems received at the second interface with the plurality of CI records of the ACMDB received at the first interface, based on a plurality of universal identifying n-tuples of the plurality of originating system records of the plurality of originating systems and the plurality of CI records of the ACMDB.

According to another implementation, a non-transitory computer-readable storage medium is provided that comprises executable instructions that, when executed by a processor, facilitate performance of operations, comprising transmitting, to the originating system over a network via a network port connected to the network, an identifying rule set that defines a minimum amount of data in order to generate an identifying signature that serves as a common reference between a record of the originating system with a matching Configuration Item (CI) record of the ACMDB, wherein the originating system includes a plurality of records to be associated with a plurality of CI records in the ACMDB, and one of the CI records comprising data related to a physical machine in an information technology system, receiving, from the originating system via the network port, at least the minimum amount of data for a first record of the originating system that is defined as being necessary in order to generate an identifying signature, generating, using a processor, based at least on the received minimum amount of data for the first record, a generated first identifying signature, matching, using the processor, the generated first identifying signature with a matching stored identifying signature stored in a memory comprising an identification signature store comprising a plurality of stored identifying signatures that have been previously generated for a plurality of CI records of the ACMDB, creating a correlated first record, using the processor, by correlating the first record of the originating system corresponding with the generated first identifying signature with a CI record of the ACMDB corresponding with the matching stored identifying signature, and outputting, at the network port, the correlated first record to a CMDB-supported activity system.

BRIEF DESCRIPTION OF THE DRAWINGS

The invention may best be understood by referring to the following description and accompanying drawings that are used to illustrate implementations of the invention.

DETAILED DESCRIPTION

Figure 1:
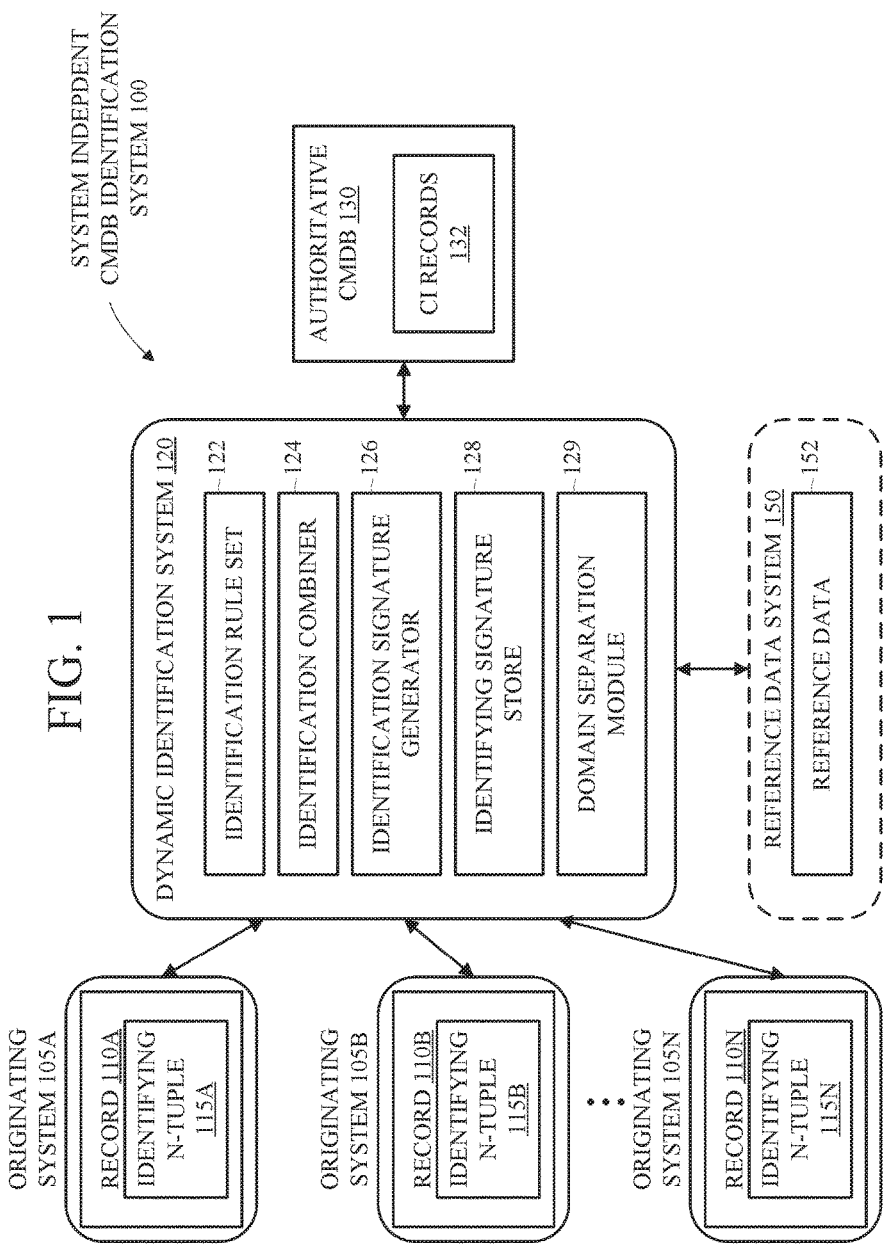
FIG. 1 is a block diagram that illustrates an example system independent CMDB identification system.

One of the advantages of a single ACMDB is the ability to connect disparate data across multiple IT management tools. These management tools can generally serve different functions, be provided by different vendors, and typically represent their data differently. This creates challenges to create a single integrated view of the data where actions can be uniformly aligned and associated with a single ACMDB.

Creating and managing an ACMDB that contains a single integrated view of IT information from multiple disparate IT management systems and tools can present a number of challenges. Typical existing solutions do not represent the information contained within the IT systems in a fashion sufficiently normalized or dynamic such that these resources could be referenced in the ACMDB. Existing solutions are not normalized and do not provide a way for information from multiple disparate systems to be referenced in a single CMDB. One potential solution is to rely on bespoke maps (custom maps or mapping tables) that specify translation rules to translate the information from these systems into the context of the records in an ACMDB. These translation rules in the custom maps do not dynamically classify the information to ensure that records are uniquely associated with records in an ACMDB. When using these custom maps, it is typically difficult to recognize when the type of information being managed is essentially identical in a fashion that is meaningful to a wide range of loosely coupled systems. Thus, the use of custom maps may cause essentially duplicative copies of information to be reported and installed in the ACMDB. In addition, custom maps are static and must be individually maintained and adjusted to support the evolution of CMDB-supported activities. As the number of systems increase, so does the complexity of maintaining and adjusting these custom maps. Furthermore, as more and more of IT information and services moves into the cloud and is automated, newer tools and technologies will represent the CIs in their own systems thereby further distancing those CIs from the data in the ACMDB.

These disadvantages make CMDB-supported activity system activities such as change planning, service impact analysis, service optimization and automated remediation activities, as well as proactive monitoring, proactive capacity management, proactive service optimization, service intelligence, and service health activities difficult.

According to an implementation, a dynamic identification system based on a set of one or more universal identifying n-tuples for records housed in originating systems as well as the ACMDB is used to return a unique identifying signature for these records for a given identifying n-tuple. This identifying signature serves as a common reference between the originating systems and the ACMDB. The dynamic identification system algorithmically classifies information across multiple originating systems as well as the ACMDB by leveraging the information provided in these systems and may also use external reference data. The dynamic identification system does not depend on static mappings and hence can apply to multiple originating systems as well as the ACMDB itself. The dynamic identification system is a multidirectional system for representing and dynamically classifying information from the originating systems and the ACMDB so that the data they can contain can be normalized and consistently referenced.

According to an implementation, the dynamic identification system is dynamic and eliminates the requirement to create bespoke static mappings for every originating system to be integrated with the ACMDB.

According to an implementation, the dynamic identification system adapts over time without changing any bespoke static mappings.

According to an implementation, originating systems and the ACMDB query the dynamic identification system to determine which parameters can be used to create an identifying signature. Different originating systems may have different data according to their respective functions, but that data may be referring to the same entity (e.g., the same device or service). The dynamic identification system can provide options for parameters to be used to create an identifying signature thereby allowing for the natural variance that exists in data available in the different originating systems. For example, the dynamic identification system may specify to the originating systems that any M number of N specific parameters (where M is less than or equal to N) is sufficient to create an identifying signature. Thus, an identifying signature may be created based on an evaluation of a set of parameters where the different originating systems may have different subsets of the set of parameters. Allowing different combinations of parameters to produce an identifying signature that is associated with the same CI record allows for greater flexibility.

According to an implementation, the identifying signature is created without the originating systems or the ACMDB changing their behavior or having knowledge of how the data is structured. Thus, the dynamic identification system allows different types of information across multiple originating systems and the ACMDB to be related using the identifying signatures.

FIG. 1 is a block diagram that illustrates an example system independent CMDB identification system 100 according to one implementation. The system independent CMDB identification system 100 includes multiple originating systems 105A-N, the dynamic identification system 120, the ACMDB 130, and the optional reference data system 150.

The originating systems 105A-N may be provided by multiple vendors and each may be providing different information and/or be part of different Information Technology Service Management (ITSM) processes. Example originating systems include: an event monitoring system that contains event records each of which include n-tuples of event properties, a discovery system that collects information about devices and/or services within a customer's environment, automated remediation systems that perform healing or self-healing actions within an environment, configuration management systems that can be configured to configure devices and/or services within an environment, and monitoring systems that monitor the health of devices and/or services within an environment. The originating systems 105A-N may be installed and running locally within a customer's environment and/or operating as a cloud-based service. The number of originating systems is by way of example only and there may be a fewer or greater number of originating systems in some implementations. In certain instances, there may be multiple implementations of certain originating systems, such as more than one discovery system each of which may be implemented by a different vendor.

Each of the originating systems 105A-N contain one or more records 110A-N, each of which has and/or is associated with an n-tuple of properties or parameters, where n is typically greater than one, that are to be associated with one or more Configuration Item (CI) records in the ACMDB. By way of example, a record that is representing a personal computer may have properties such as the manufacturer, product name, serial number, MAC address, computer name, etc. A subset of these properties are used by the dynamic identification system 120 for the purpose of generating an identifying signature and correlating with one or more CI records in the ACMDB 130, which will be described in greater detail later herein. These subset of n-tuple properties is sometimes referred herein as an identifying n-tuple. Thus, each of the records 110A-N has and/or is associated with an identifying n-tuple 115A-N. Although FIG. 1 illustrates one record in each originating system, there are typically many more records in each originating system that may have different identifying n-tuples.

The ACMDB 130 includes many different CI records 132 and may act as the single source of data for the ITSM processes. A CI record may represent a physical entity, such as a computer or router, a logical entity, such as an instance of a database, or a conceptual entity, such as a requisition service. Each of the CI records 132 in the ACMDB 130 have one or more relationships to other CIs, users, and/or groups. The CI records 132 may be populated in the CMDB 130 in a number of ways including using an automated discovery product, such as that described in U.S. Patent Application Ser. No. 62/095,249, herein incorporated by reference, importing the information from an external source, and/or integrating with existing external CMDBs. The automated discovery product may be installed on the network to collect information regarding hardware on the network (e.g., laptops, desktops, servers, printers, etc.), software running on that hardware, and the relationship between the items, and report back that information back to the ACMDB 130. Importing the information from an external source may be done through an import of information in a standard file format such as XML or CSV, which is then transformed into appropriate tables and records in the ACMDB 130. The CI records 132 may be imported into the ACMDB 130 by integrating the ACMDB 130 with other CMDBs (not illustrated in FIG. 1).

The records 110A-N of the originating systems 105A-N may not be natively correlated with the CI records 132 of the ACMDB 130. By way of example, in the case of incident management or event monitoring, if an alarm is being generated by an originating system, there is typically no native association between the alarm and the ITIL process(es) affected by the alarm. For example, there is typically no native association between the alarm and the CI record(s) affected by the alarm such that the device(s) affected by the alarm and the personnel to address the alarm can be automatically determined. Instead, determining what is impacted by the alarm and who should be assigned the alarm traditionally required human intelligence to speculate which CI record(s) are affected for the alarm and who should be assigned the alarm.

The dynamic identification system 120 correlates records of n-tuples in the originating systems 105A-N with CI records 132 in the ACMDB 130. To say it another way, the dynamic identification system 120 automatically associates records in the originating systems 105A-N with the appropriate CI records 132 in the ACMDB 130. According to an implementation, the dynamic identification system 120 does not depend on static mappings. The dynamic identification system 120 generates a unique identifying signature from a set of identifying properties to serve as a common reference between the originating systems 105A-N and the ACMDB 130. The identifying signature can be used by the originating systems 105A-N and the ACMDB 130 so that data between different originating systems 105A-N can be consistently referenced in the ACMDB 130. By way of example, in the case of incident management or event monitoring, an identifying signature may be produced for an alarm generated by an originating system where that identifying signature is associated with CI record(s) in the ACMDB 130. As a result, the device(s) or service(s) affected by the alarm can be automatically determined and the alarm can be automatically assigned to the appropriate personnel (based on the CI record(s) associated with the identifying signature).

The dynamic identification system 120 includes an identifying rule set 122 that defines the minimum amount of information that needs to be known in order to generate an identifying signature. An identifying rule set can include a number of identification rules which can be dynamically generated, added, and or removed from the identifying rule set. The identifying rule set and/or identification rules can be generated, for example, by using machine learning techniques, and thus the rule set can be dynamically changeable. According to an implementation, the minimum amount of information specifies multiple properties that can be used to generate an identifying signature. Since not every one of the originating systems 105A-N have the same available data, the identifying rule set 122 may specify that a subset of properties can be used to generate an identifying signature. For example, the identifying rule set 122 may specify that any M number of N specific properties (where M is less than or equal to N) is sufficient to create an identifying signature for a given record. Allowing any combination of a certain number of specific properties allows for the natural variance that exists in the data available in the originating systems 105A-N. By way of a specific example and not limitation, an identification rule set may indicate that the following three identifying n-tuple properties can be used to generate an identifying signature (manufacturer, serial number, and product name) and a minimum of two of these properties must be known in order to generate an identifying signature. The identifying rule set 122 may also specify whether any of the n-tuple properties is mandatory. A mandatory n-tuple property must be provided in order to generate an identifying signature. To further extend the above example, an identification rule may indicate that the following three identifying n-tuple properties can be used to generate an identifying signature (manufacturer, serial number, and product name), a minimum of two of these properties must be known, and the serial number property is mandatory. An identification rule may also require a class of data, which indicates the type of data the record is referring. Example classes of data may include server data, printer data, personal computer data, network data, services data, logical configuration item data, etc.

As described in further detail later herein, in some implementations the dynamic identification system 120 may be able to generate an identifying signature for a record of an originating system even if not the minimum amount of information to generate the identifying signature is not provided by that originating system. For example, the information provided by the originating system may be supplemented through use of the reference data system 150. The reference data system 150 includes reference data 152 which is supplemental information that can be used to derive properties that are missing from an identifying n-tuple transmitted by an originating system. The reference data 152 can be provided through an import of collected or created data or through manual entry. The reference data 152 can conform to a predetermined schema. In one example, the reference data 152 may include a set of mappings such as vendor name to serial number, type of system (e.g., network switch, server, etc.). For example, the reference data can identify a particular type of device (e.g., Dell Optiplex 600 series computing device, Cisco 7000 series networking device, Apache web server). By way of example, if the minimum amount of information required in one implementation is the manufacturer, product name, and serial number, but the information provided only has the product name and serial number, the dynamic identification system 120 may access the reference data 152 to determine the manufacturer based on the product name and serial number. The reference data 152 may be maintained and updated as new products are introduced into the market.

The identifying rule set 122 may also serve as documentation for the originating systems 105A-N and the ACMDB 130 as to the format and structure that should be applied to the identifying n-tuple. For example, an identification rule may indicate that the identifying n-tuple properties are case insensitive UNICODE and will ignore whitespace and special characters. According to an implementation, prior to an originating system 105 transmitting an identifying n-tuple to the dynamic identification system 120, that originating system 105 structures the format of the data according to the identification rule. In another implementation the originating system 105 does not change the structure of any data of the identifying n-tuple and the dynamic identification system 120 performs any necessary changes to the data for normalization purposes. By way of example, an identification rule set or set of rules may require that a MAC address be evaluated without any characters between digits such as the use of colons or hyphens that are commonly added to make the address more human-readable, such that, according to an implementation, the originating system converts the MAC address if necessary and in another implementation the dynamic identification system 120 normalizes the MAC address if necessary.

According to an implementation, the specific properties if an identification rule are selected such that the values of the specific property are expected to be the same for the same entity regardless of which of the originating systems 150A-N or ACMDB 130 uses that property for that entity. For example, a MAC address of a particular personal computer is expected to have the same value if included in the record 110A of originating system 105A and if included in the record 110B of originating system 105B. To say it another way, according to an implementation, a property that is unique to an originating system is not used as one of the properties of an identifying n-tuple.

The identifying rule set may be dependent on the CI records 132 in the ACMDB 130 in some implementations. For example, if a CI record for server data includes a set of N properties (e.g., four properties such as, manufacturer, product name, serial number, and MAC address) an identification rule may specify that a unique identifying signature may be generated that uniquely identifies that CI record if any M number of those N parameters (where M is less than or equal to N) is provided. Thus, in some implementations, an identification rule will not allow for a property to be used in an identifying n-tuple when generating an identifying signature that identifies a CI record in the ACMDB 130 if that CI record does not have that parameter. To say it another way, if CI records for server data do not include a particular parameter, that particular parameter will not be used as one of the properties of an identifying n-tuple according to one implementation.

The identifying rule set 122 is queryable by the originating systems 105A-N and the ACMDB 130 according to one implementation. In such an implementation, each of the originating systems 105A-N and the ACMDB 130 query the dynamic identification system 120 for the identifying n-tuple options for creating an identifying signature. According to an implementation, the identifying rule set 122 need only to be queried by a particular originating system 105 or ACMDB 130 once per class of data. For example, the originating system 105A may query the dynamic identification system 120 for the identifying rule set applicable to data of the server class and store the returned identifying rule set such that it knows the type of identifying n-tuple information to provide for generating an identifying signature for any records of that server class. If a new type of class is added or available to the originating system 105, then it may query the dynamic identification system 120 again for the identifying rule set applicable to that type of class. According to an implementation, querying the dynamic identification system 120 for the identifying rule set is an integration task that is performed automatically if an originating system is to be integrated with the system described herein.

Although the originating systems 105A-N and the ACMDB 130 can query the dynamic identification system 120 for the identifying rule set, the underlying software or function of the originating systems 105A-N and the ACMDB 130 do not have to change. For example, if the originating system 105A is an event monitoring system, the underlying function of the event monitoring system will not be changed by integrating with the dynamic identification system 120. Thus, after an initial procedure is performed for the originating systems 105A-N to be integrated with the dynamic identification system 120 to determine what needs to be passed to the dynamic identification system 120 to generate an identifying signature (e.g., what properties to pass to the dynamic identification system 120), the underlying behavior of the originating systems 105A-N will not change and they do not need to have knowledge of how the data is structured in the ACMDB 130.

After an originating system 105 or ACMDB 130 possesses the information necessary to provide to the dynamic identification system 120 in order to generate a unique identifying signature, that originating system or ACMDB may sometime later provide the appropriate information and be returned that unique identifying signature.

The dynamic identification system 120 further includes the identifying signature generator 126 that generates a unique identifying signature from a set of identifying properties in such a way as to enable that identifying signature to serve as a common reference between the originating systems 105A-N and the ACMDB 130. The identifying signature generator 126 takes as input the required identifying n-tuple (according to the corresponding identification rule) and may also take as input the class of data. The identifying signature generator 126 uses the identifying n-tuple information and applies them in such a way to create a unique identifier such that different values of those n-tuples provide a different unique identifier.

The identifying signatures are stored in the identifying signature store 128 and are associated with reference to a CI record 132 in the ACMDB 130. According to an implementation, the identifying signature generator 126 generates an identifying signature for each unique combination of identifying n-tuples for a given CI record thereby creating a unique identifying signature for each possible combination of identifying n-tuples. For example, if there are three different possible combinations of identifying n-tuples for a given CI record (according to the corresponding identification rule), three different identifying signatures are generated for the CI record and stored in the identifying signature store 128. In other implementations, the identifying signature may be optimized such that a given identifying signature can represent more than one unique identifying signature. For example, an identifying signature can include a range of values for particular element(s) of the n-tuples.

The dynamic identification system 120 further includes the identification combiner 124 which combines identifying n-tuple data from an originating system and potentially other data from the reference data system 150 such that the minimum amount of identifying n-tuple information is available for the identifying signature generator 126 when generating the identifying signature. For example, identification combiner 124 may access the reference data 152 in an attempt to supplement any missing information from the available identifying n-tuple. For example, if the minimum amount of information required is the manufacturer, product name, and serial number, but the information provided only has the product name and serial number, the identification combiner 124 may access the reference data 152 to determine the manufacturer based on the product name and serial number.

In an implementation, the dynamic identification system 120 can further include a domain separation module 120. Domain separation refers to segmenting of the ACMDB such that one ACMDB can be used to reflect more than one information technology infrastructure. As an example, the ACMDB can be provisioned for or provided to a customer who is an information technology management firm that manages the information technology infrastructure of a number of different clients, at least some of whom have distinct information technology infrastructures. In a domain separation implementation, the information technology management firm customer can manage the information technology infrastructure of each of its clients while maintaining separation between the records for each of the clients. For example, the separation can be used to permit a client to access only the CMDB records for that client's information technology infrastructure and not the CMDB records for other clients. Domain separation can be used in other situations as well. For example, a company having multiple subsidiaries or divisions could use domain separation for the information technology infrastructure of each of its subsidiaries or divisions.

In a domain separation implementation, certain aspects of the identification rule set 122, identification combiner 124, identifying signature generator 126, and identifying signature store 128 may also have to be segmented. For example, there may be distinct rule sets, combining rules, signature generators, and or signature store records for each domain separation. In one example, one domain (e.g., client, subsidiary, or division) may have a unique set of identification rules, ways of combining information, or signature generation as compared to other domains. In another example, a different set of originating systems may be used for each domain. By permitting distinct originating systems, rules, combinations, and generations by domain, the domain separation module enables the dynamic identification system 120 to operate with domain separated ACMDBs. The use of a domain separation module 120 is an example of one implementation. In other implementations, functionality for domain separation may be included directly in certain modules of identification system 120 and domain separation module 120 may be omitted. In other implementations, domain separation functionality may not be provided at all.

According to an implementation, the minimum amount of information for a given class of data may automatically adapt over time as the dynamic identification system learns more and more. For example, as devices are added into the IT environment and thus into the system of FIG. 1, the more information may be learned about a particular asset that is mapped to the same identifying signature. For example, a first identifying n-tuple may be received at the dynamic identification system 120 that has a first number of properties that is associated with an identifying signature and at some point later a second identifying n-tuple may be received at the dynamic identification system 120 that has a second number of properties that is also associated with an identifying signature, where at least some of the first and second number of properties are different. To say it another way, a later identifying n-tuple may provide different information than a previous identifying n-tuple. As more properties are identified against an identifying signature the more complete the interpretation of the data can become. Over time, properties associated with an identifying signature can be added to the reference database to improve the operation of the dynamic identification system 120.

Figure 2:
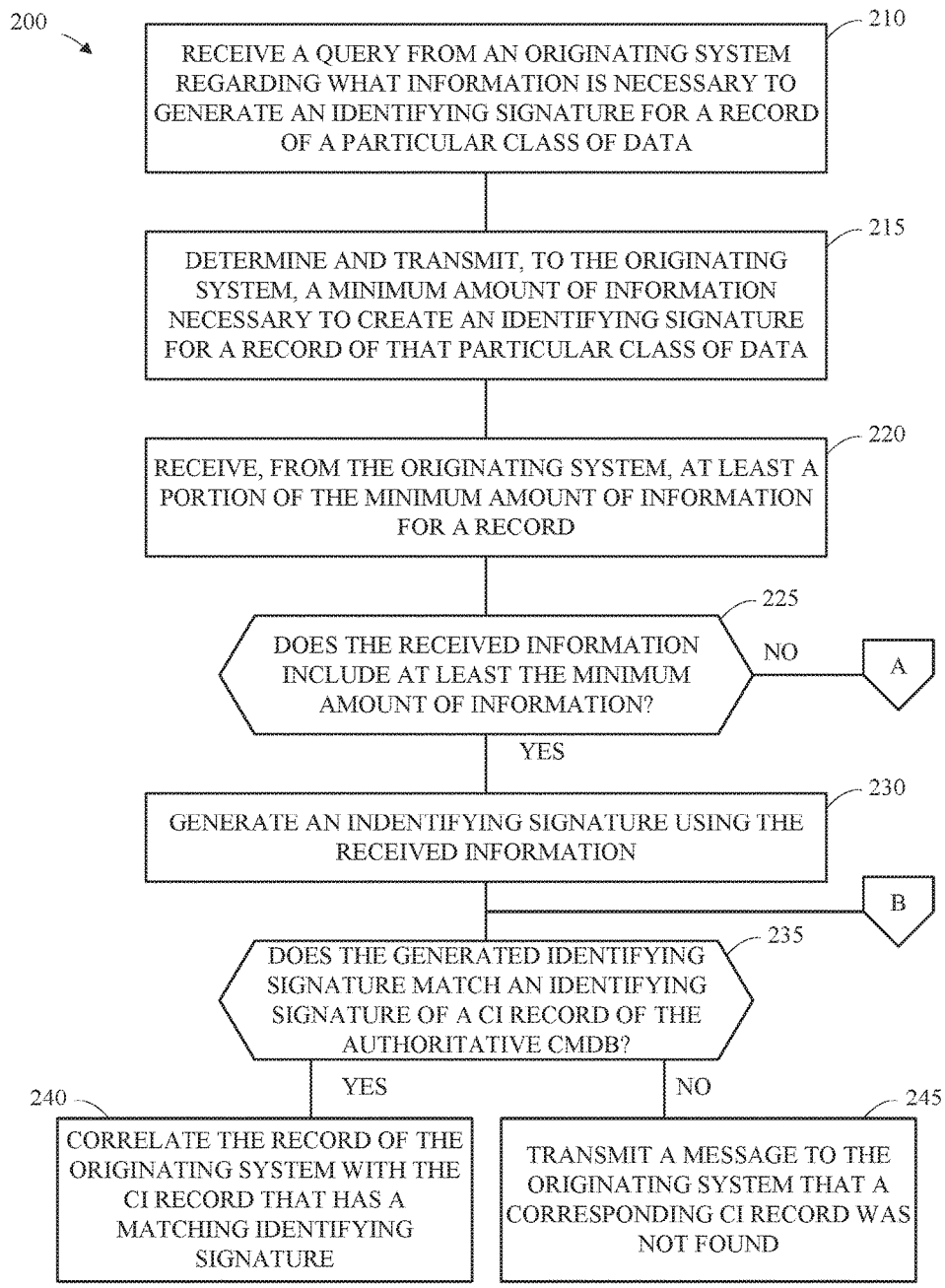
FIG. 2 is a flowchart that illustrates example operations for correlating a record in an originating system with a record of an ACMDB.

FIG. 2 is a flowchart that illustrates example operations for correlating a record in an originating system with a record of an ACMDB 200 according to one implementation. The operations of this and other flow diagrams will be described with reference to the aspects of the other diagrams. However, the operations of the flow diagrams can be performed by other configurations than those discussed with reference to these other diagrams, and the implementations discussed with reference these other diagrams can perform operations different than those discussed with reference to the flow diagrams.

At operation 210, the dynamic identification system 120 receives a query from one of the originating systems 105 regarding what information is necessary to generate an identifying signature for a record of a particular class of data (e.g., server, personal computer, printer, etc.). This query may be part of a common integration task when integrating this originating system 105 into the system independent CMDB identification system 100. Flow then moves to operation 215.

At operation 215, the dynamic identification system 120 determines and transmits to the originating system a minimum amount of information necessary to create an identifying signature for a record of that particular class of data. The dynamic identification system 120 accesses the identifying rule set 122 to determine what the minimum information is needed in order to generate the identifying signature for the class of data. Depending on the identification rule, the minimum amount of information may be multiple specific parameters or any combination of a subset of multiple specific parameters. For example, the minimum amount of information may specify that any M number of N specific properties (where M is less than or equal to N) is sufficient to create an identifying signature for a given record for the class of data. The minimum amount of information may specify whether a particular property is mandatory. The dynamic identification system 120 may also transmit the format for the information transmitted to the dynamic identification system 120. Flow moves from operation 215 to operation 220.

The operations 210 and 215 may be performed as part of a registration or integration procedure to integrate the originating system with the dynamic identification system 120. These operations are performed for each of the originating systems 105A-N. According to an implementation, the operations 210 and 215 need only to be performed once per class of data, however they may be performed more frequently if desired.

At operation 220, the dynamic identification system 120 receives, from the originating system, at least a portion of the minimum amount of information for a record. Even though the originating system received the minimum amount of information necessary for generating an identifying signature, it may still request an identifying signature if it does not have all of the required minimum amount of information. Depending on the information that is missing, the dynamic identification system 120 may be able to use the reference data 152 to derive the missing information. The received information is typically in the form of one or more properties and their values. The dynamic identification system 120 may also receive information regarding the class of data of the information. According to an implementation, prior to transmitting the information, the originating system ensures that the format of the information transmitted is consistent with the format required by the dynamic identification system 120, including normalizing any data as appropriate.

Flow then moves to operation 225 where the dynamic identification system 120 determines whether the received information includes enough detail to generate an identifying signature. For example, the dynamic identification system 120 accesses the identifying rule set 122 to determine the minimum amount of information needed for the class of data and compares it to the information received. If there is not enough information received from the originating system, then flow moves to operation 310 which will be described in greater detail with respect to FIG. 3. If there is enough information, then flow moves to operation 230.

At operation 230, the dynamic identification system 120 generates an identifying signature using the received information. According to an implementation, prior to generating the identifying signature, the dynamic identification system normalizes the data. For example, white spaces may be removed, special characters may be removed, and/or other actions may be taken to normalize the data. According to an implementation, the identifying signature generator 126 is used and takes as input the required minimum information and also the class of data. The identifying signature generator creates a unique identifier. Flow then moves to operation 235.

At operation 235, the dynamic identification system 120 determines whether the generated identifying signature matches an identifying signature of a CI record of the ACMDB 130. For example, the dynamic identification system 120 accesses the identifying signature store 128 that stores identifying signatures associated with one or more CI records 132 in the ACMDB 130 to determine whether the generated identifying signature matches an identifying signature of a CI record in the ACMDB 130. If there is a matching identifying signature, then flow moves to operation 240. If there is not a matching identifying signature, then flow moves to operation 245 where the dynamic identification system 120 transmits a message to the originating system that a corresponding CI record could not be located in the ACMDB 130. At operation 240, the dynamic identification system 120 correlates the record of the originating system corresponding with the generated identifying signature with the one of the CI records of the ACMDB 130 that corresponds with the matching one of the identifying signatures.

Figure 3:
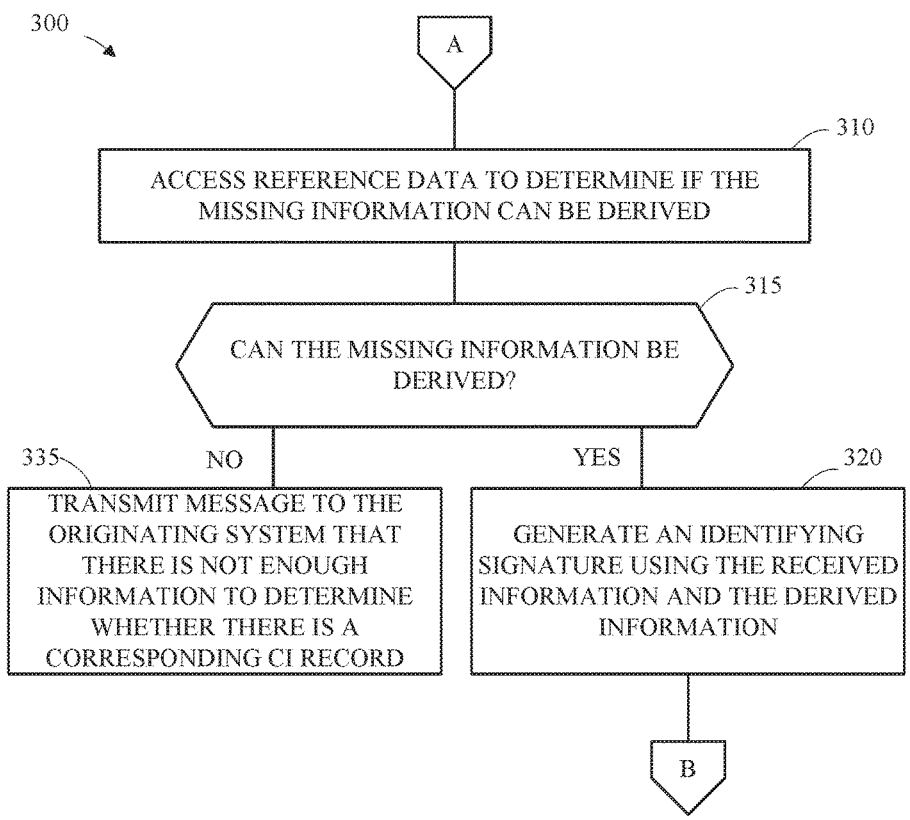
FIG. 3 is a flowchart that illustrates example operations performed when there is not enough information to generate an identifying signature according to one implementation.

FIG. 3 is a flowchart that illustrates example operations performed when there is not enough information to generate an identifying signature according to one implementation. The operations of FIG. 3 may be performed upon determining that the received information from an originating system does not contain enough information to generate an identifying signature.

At operation 310, the dynamic identification system 120 accesses reference data 152 of the reference data system 150 to determine whether the missing information can be derived from the reference data 152 based on the information that has been provided. The reference data 152 may include a set of mappings such as vendor name to serial number, type of system (e.g., network switch, server, etc.). By way of example, if the minimum amount of information required is the manufacturer, product name, and serial number, but the information provided only has the product name and serial number, the dynamic identification system 120 may access the reference data 152 to determine the manufacturer based on the product name and serial number. At operation 315, it is determined whether the missing information can be derived from the reference data 152. If it can be derived, then flow moves to operation 320.

If the missing information cannot be derived, then flow moves to operation 335 where the dynamic identification system 120 transmits a message to the originating system that indicates that there is not enough information to generate an identifying signature or determine whether there is a corresponding CI record in the ACMDB 130. The dynamic identification system 120 may also transmit the appropriate identification rule to the originating system and query the originating system to resubmit the information. In an alternative implementation, depending on the uniqueness of the information received, dynamic identification system 120 can query a different originating system or the ACMDB 130 for the missing information.

At operation 320 (the missing information can be derived), the dynamic identification system 120 generates an identifying signature using the received information from the originating system 120 and the supplemented information. According to an implementation, prior to generating the identifying signature, the dynamic identification system 120 normalizes the data if necessary as previously described. According to an implementation, the identifying signature generator 126 is used and takes as input the required minimum information and also the class of data. The identifying signature generator creates a unique identifier. Flow then moves to operation 325.

At operation 325, the dynamic identification system 120 determines whether the generated identifying signature matches an identifying signature of a CI record of the ACMDB 130. For example, the dynamic identification system 120 accesses the identifying signature store 128 that stores identifying signatures associated with one or more CI records 132 in the ACMDB 130 to determine whether the generated identifying signature matches an identifying signature of a CI record in the ACMDB 130. If there is a matching identifying signature, then flow moves to operation 330. If there is not a matching identifying signature, then flow moves to operation 340 where the dynamic identification system 120 transmits a message to the originating system that a corresponding CI record could not be located in the ACMDB 130. At operation 330, the dynamic identification system 120 correlates the record of the originating system corresponding with the generated identifying signature with the one of the CI records of the ACMDB 130 that corresponds with the matching one of the identifying signatures.

Figure 4A:
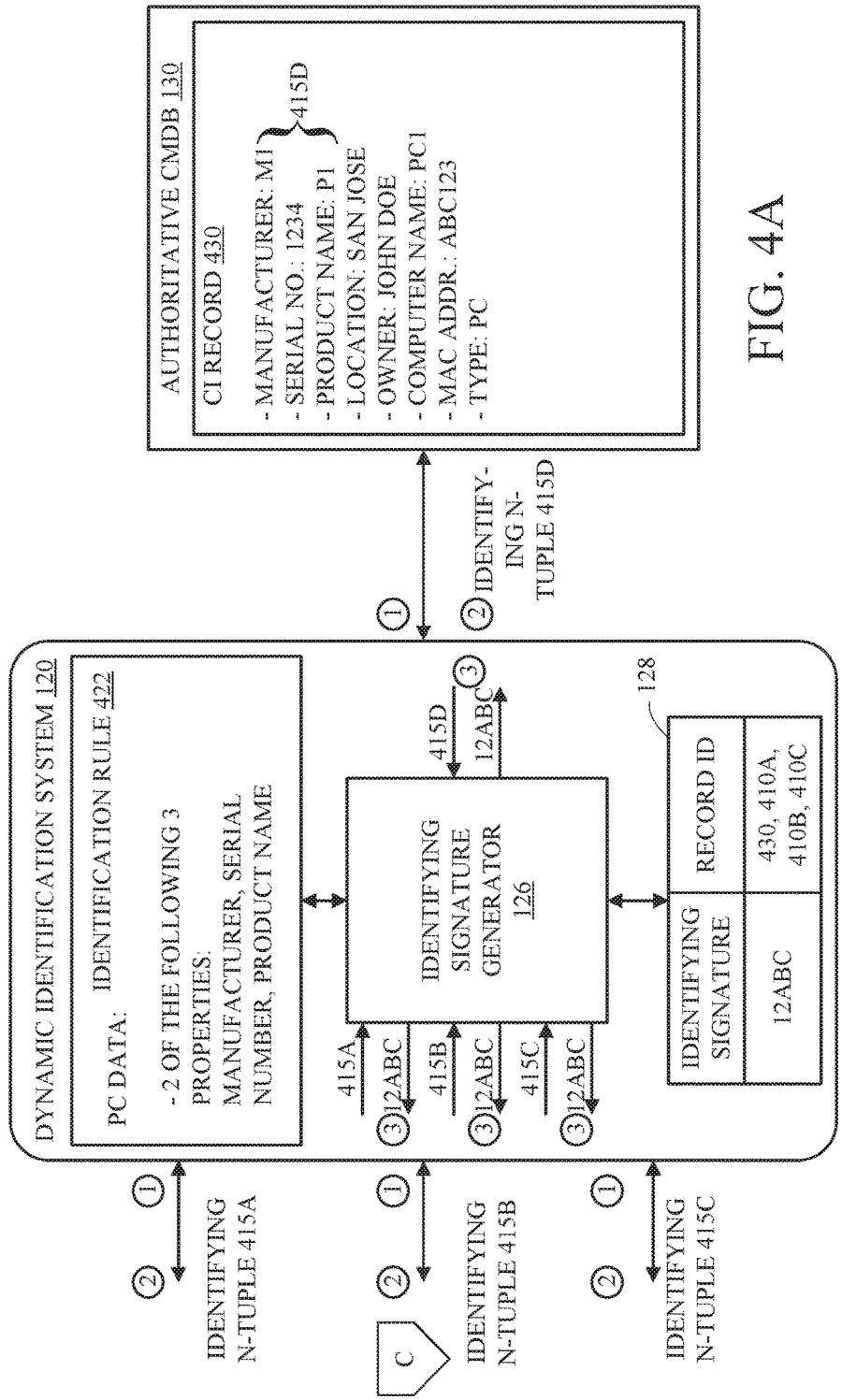
FIGS. 4A and 4B together comprise a block diagram that illustrates an example of the system independent CMDB identification system.
Figure 4B:
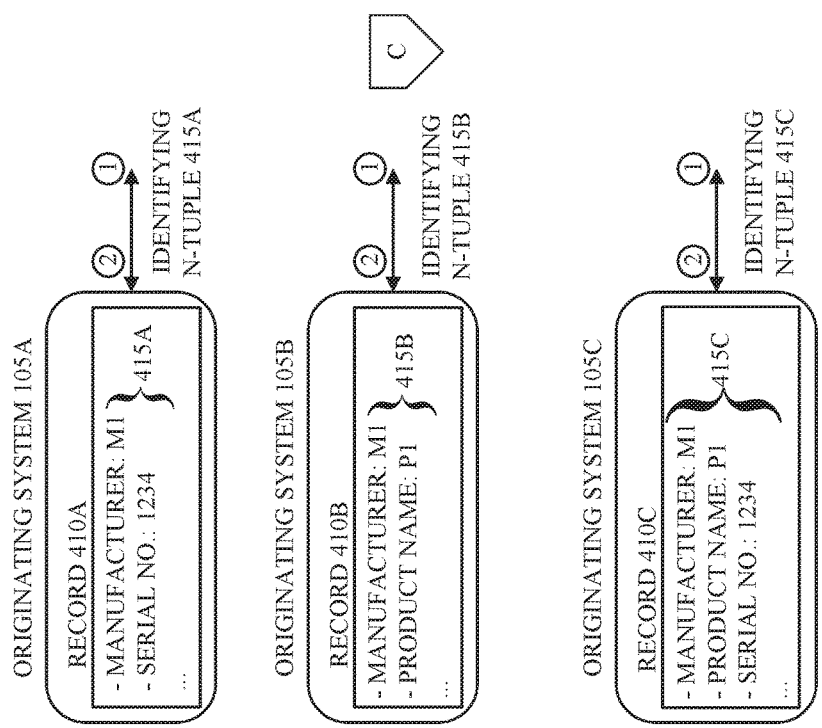

FIGS. 4A and 4B together comprise a block diagram that illustrates an example of the system independent CMDB identification system 100 according to one implementation. These figures illustrate the originating systems 105A-C having records 410A-C respectively, each having different information. Each of the records 410A-C have data corresponding to the same CI record 430 of the ACMDB 130. Thus, each of the records 410A-C is of data belonging to the same entity as the CI record 430. Using a subset of the properties of the records 410A-C and the CI record 430, the dynamic identification system 120 generates a unique identifying signature that serves as a common reference for these records.

At an operation 1, the dynamic identification system 120 transmits the identification rule 422 to the originating systems 105A-C and the ACMDB 130. The originating systems 105A-C likely have different available data because of their different functions. Because of this, the identification rule 422 provides options for the data provided by the originating systems 105A-C in order to generate a unique identifying signature. In the example of FIG. 4A, the identification rule 422 specifies that for PC data, the minimum amount of information necessary to generate an identifying signature is two of the following three properties: manufacturer, serial number, and product name. The identification rule 422 may be transmitted to the originating systems 105A-C and the ACMDB 130 upon request by those systems (e.g., upon receiving a query).

As illustrated in FIG. 4, the records 410A-C of the originating systems 105A-C have different information available to meet the identification rule 422. For example, the record 410A includes a manufacturer property and a serial number property; the record 410B includes a manufacturer property and a product name property; and the record 410C includes a manufacturer property, a product name property, and a serial number property. The records 410A-C may include many more properties, but they are not illustrated for simplicity purposes. These originating systems may have different data because they may be providing different ITSM functions.

After receiving the identification rule 422, at some point later when the originating systems 105A-C and/or the ACMDB 130 transmit an identifying n-tuple that meets the identification rule 422 in order for the dynamic identification system 120 to generate an identifying signature. For example, at operation 2, the identifying n-tuple 415A is transmitted from the originating system 105A to the dynamic identification system 120, the identifying n-tuple 415B is transmitted from the originating system 105B to the dynamic identification system 120, the identifying n-tuple 415C is transmitted from the originating system 105C to the dynamic identification system 120, and the identifying n-tuple 415D is transmitted from the ACMDB 130 to the dynamic identification system 120.

After verifying there is enough information to generate an identifying signature, the dynamic identification system 120 uses the identifying signature generator 126 to generate an identifying signature for the identifying n-tuples received from the originating systems 105A-C and the ACMDB 130. As illustrated in FIGS. 4A, B, since each of the identifying n-tuples 415A-D share at least two of the same three properties as defined in the identification rule 422, the identifying signature generated by the identifying signature generator 126 will be matching for those identifying n-tuples 415A-D. As illustrated in FIG. 4, at operation 3 identifying signatures are generated for the identifying n-tuples received from the originating systems 105A-C and the ACMDB 130 (the identifying signature 12*abc* is generated for the identifying n-tuples 415A-D).

After generating the identifying signature, matching records can be correlated. For example, at operation 4, the dynamic identification system 120 correlates the identifying signature 12ABC with the records 410A-C and 430 of the originating systems 105A-C and ACMDB 130 in the identifying signature store 128. Thus, even though the originating systems 105A-C have disparate data, the identifying signature allows the data to be automatically correlated when the data is referring to the same entity.

The configurations described herein allow multiple management products (e.g., different originating systems) to be integrated to provide a single integrated service where IT actions can be uniformly aligned and associated with an ACMDB. For example, these identifying signatures may be used by multiple CMDB-supported activities such as change planning, service impact analysis, service optimization, automated remediation, proactive monitoring, proactive capacity management, proactive service optimization, service intelligence, and/or service health activities. By way of a specific example, in the case of incident management or event monitoring, an identifying signature may be produced for an alarm generated by an originating system where that identifying signature is associated with CI record(s) in the ACMDB 130. As a result, the device(s) or service(s) affected by the alarm can be automatically determined and the alarm can be automatically assigned to the appropriate personnel (based on the CI record(s) associated with the identifying signature).

According to an implementation, the dynamic identification system 120 is part of a cloud-based system as a service (SaaS) for IT service management. Communication between the originating systems 105A-N and the dynamic identification system 120 may be over a secure connection such as Secure Sockets Layer (SSL) or Transport Layer Security (TLS) and/or otherwise encrypted, and be over a public network (e.g., the Internet). In another implementation, the dynamic identification system 120 is installed at a customer's premise where communication between the originating systems 105A-N and the dynamic identification system 120 is performed within a local network.

Figure 5A:
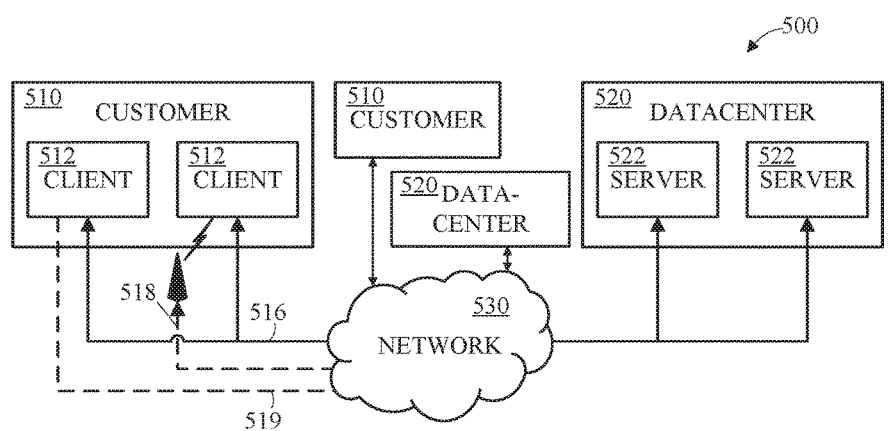
FIG. 5A is a block diagram of a networked distributed or cloud computing system in which the teachings herein may be implemented.

FIG. 5A is a block diagram of a distributed (e.g., client-server, networked, or cloud) computing system 500 in which the system can be applied. Use of the phrase "cloud computing system" herein is a proxy for any form of a distributed computing system, and this phrase is used simply for ease of reference. Cloud computing system 500 can have any number of customers, including customer 510. Each customer 510 may have clients, such as clients 512. Each of clients 512 can be in the form of a computing system including multiple computing devices, or in the form of a single computing device, for example, a mobile phone, a tablet computer, a laptop computer, a notebook computer, a desktop computer, and the like. Customer 510 and clients 512 are examples only, and a cloud computing system may have a different number of customers or clients or may have a different configuration of customers or clients. For example, there may be hundreds or thousands of customers and each customer may have any number of clients.

Cloud computing system 500 can include any number of datacenters, including datacenter 520. Each datacenter 520 may have servers, such as servers 522. Each datacenter 520 may represent a facility in a different geographic location where servers are located. Each of servers 522 can be in the form of a computing system including multiple computing devices, or in the form of a single computing device, for example, a desktop computer, a server computer and the like. The datacenter 520 and servers 522 are examples only, and a cloud computing system may have a different number of datacenters and servers or may have a different configuration of datacenters and servers. For example, there may be tens of data centers and each data center may have hundreds or any number of servers.

Clients 512 and servers 522 may be configured to connect to network 530. The clients for a particular customer may connect to network 530 via a common connection point 516 or different connection points, e.g. a wireless connection point 518 and a wired connection point 519. Any combination of common or different connections points may be present, and any combination of wired and wireless connection points may be present as well. Network 530 can be, for example, the Internet. Network 530 can also be or include a local area network (LAN), wide area network (WAN), virtual private network (VPN), or any other means of transferring data between any of clients 512 and servers 522. Network 530, datacenter 520 and/or blocks not shown may include network hardware such as routers, switches, load balancers and/or other network devices.

Other implementations of the cloud computing system 500 are also possible. For example, devices other than the clients and servers shown may be included in system 500. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 522.

Figure 5B:
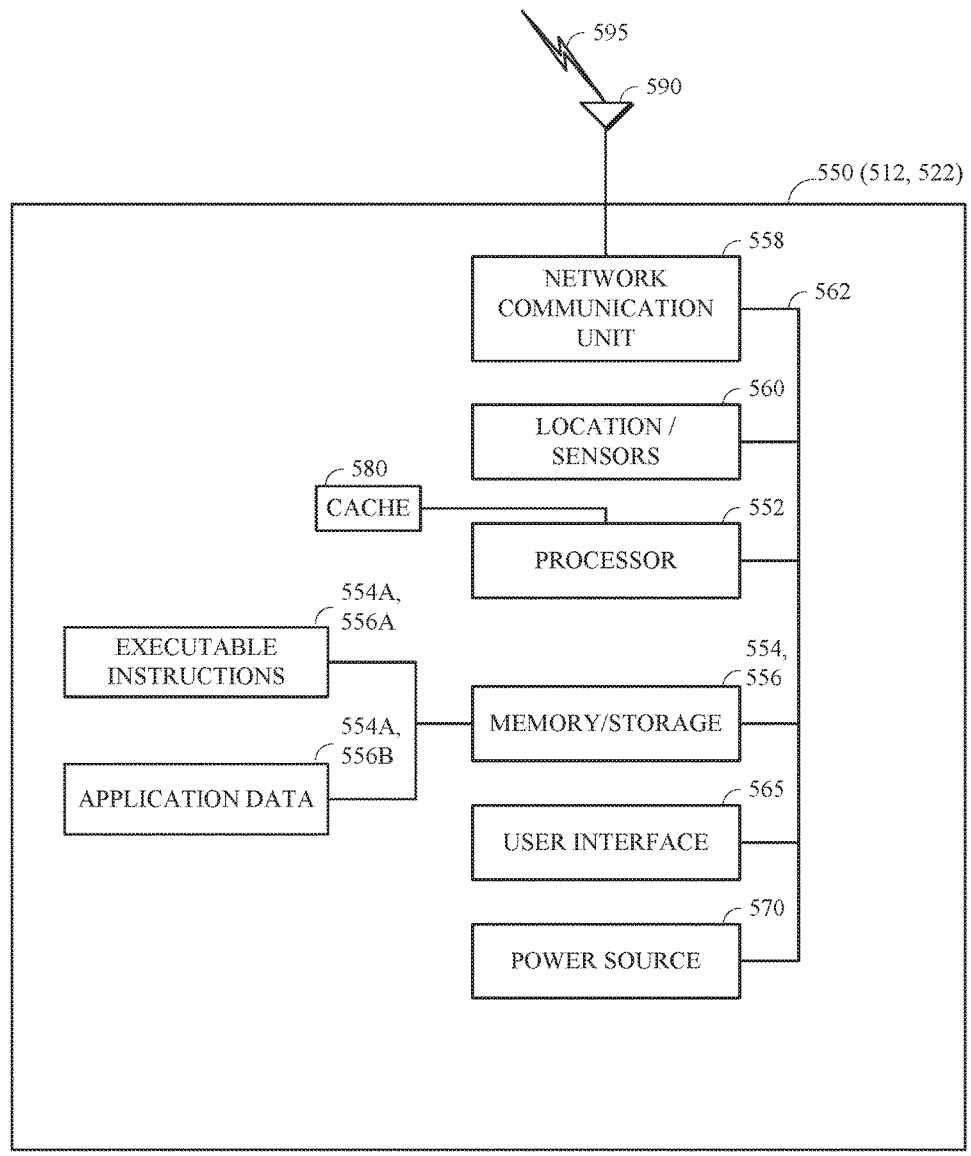
FIG. 5B is a block diagram of an example internal configuration of a computing device, such as a computing device of the computing system as shown in FIG. 5A.

FIG. 5B is a block diagram of an example internal configuration of a computing device 550, such as a client 512 or server device 522 of the computing system 500 as shown in FIG. 5A, including an infrastructure control server, of a computing system. As previously described, clients 512 or servers 522 may take the form of a computing system including multiple computing units, or in the form of a single computing unit, for example, a mobile phone, a tablet computer, a laptop computer, a notebook computer, a desktop computer, a server computer and the like.

The computing device 550 can include a number of components, as illustrated in FIG. 5B. CPU (or processor) 552 can be a central processing unit, such as a microprocessor, and can include single or multiple processors, each having single or multiple processing cores. Alternatively, CPU 552 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 552 can be distributed across multiple machines that can be coupled directly or across a local area or other network The CPU 552 can be a general purpose processor or a special purpose processor.

Random Access Memory (RAM 554) can be any suitable non-permanent storage device that is used as memory. RAM 554 can include executable instructions and data for immediate access by CPU 552. RAM 554 typically comprises one or more DRAM modules such as DDR SDRAM. Alternatively, RAM 554 can include another type of device, or multiple devices, capable of storing data for processing by CPU 552 now-existing or hereafter developed. CPU 552 can access and manipulate data in RAM 554 via bus 562. The CPU 552 may utilize a cache 580 as a form of localized fast memory for operating on data and instructions.

Storage 556 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 556 can include executable instructions 556A and application files/data 556B along with other data. The executable instructions 556A can include, for example, an operating system and one or more application programs for loading in whole or part into RAM 554 (with RAM-based executable instructions 554A and application files/data 554B) and to be executed by CPU 552. The executable instructions 556A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 556B can, for example, include user files, database catalogs and configuration information. In an implementation, storage 556 includes instructions to perform the discovery techniques described herein. Storage 556 may comprise one or multiple devices and may utilize one or more types of storage, such as solid state or magnetic.

The computing device 550 can also include one or more input/output devices, such as a network communication unit 558 and interface 590 that may have a wired communication component or a wireless communications component 595, which can be coupled to CPU 552 via bus 562. The network communication unit 558 can utilized any of a variety of standardized network protocols, such as Ethernet, TCP/IP, to name a few of many protocols, to effect communications between devices. The interface 590 can comprise one or more transceiver(s) that utilize the Ethernet, power line communication (PLC), WiFi, infrared, GPRS/GSM, CDMA, etc.

A user interface 565 can include a display, positional input device (such as a mouse, touchpad, touchscreen, or the like), keyboard, or other forms of user input and output devices. The user interface 565 can be coupled to the processor 552 via the bus 562. Other output devices that permit a user to program or otherwise use the client or server can be provided in addition to or as an alternative to display 565. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 550 are also possible. For example, servers may omit display 565. RAM 554 or storage 556 can be distributed across multiple machines such as network-based memory or memory in multiple machines performing the operations of clients or servers. Although depicted here as a single bus, bus 562 can be composed of multiple buses, that may be connected to each other through various bridges, controllers, and/or adapters. Computing devices 550 may contain any number of sensors and detectors that monitor the device 550 itself or the environment around the device 550, or it may contain a location identification unit 560, such as a GPS or other type of location device. The computing device 550 may also contain a power source 570, such as a battery, so that the unit can operate in a self-contained manner. These may communicate with the CPU/processor 552 via the bus 562.

All or a portion of implementations or aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the invention could employ any number of conventional techniques for electronics configuration, signal processing and/or control, data processing and the like. The words "mechanism" and "element" are used broadly and are not limited to mechanical or physical embodiments, implementations, or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any aspect or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described implementations have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A computer-implemented method in a dynamic identification system for operation of a network utilizing an Authoritative Configuration Management Database (ACMDB) comprising configuration item (CI) records, at least one CI record of the CI records comprising data related to an element in an information technology system, the method comprising:
    transmitting, to an originating system over the network via a network port connected to the network, an identifying rule set that defines a minimum amount of data in order to generate an identifying signature that serves as a common reference between a record of the originating system with a matching CI record of the ACMDB, wherein the originating system includes a plurality of records to be associated with a plurality of CI records in the ACMDB;
    receiving, from the originating system via the network port, at least the minimum amount of data for a first record of the originating system that is defined as being necessary in order to generate the identifying signature;
    generating, using a processor, based at least on the received minimum amount of data for the first record, a first identifying signature;
    matching, using the processor, the generated first identifying signature with a first matching stored identifying signature stored in a memory comprising an identification signature store comprising a plurality of stored identifying signatures that have been previously generated for a plurality of CI records of the ACMDB;
    creating a correlated first record, using the processor, by correlating the first record of the originating system corresponding with the generated first identifying signature with a first CI record of the ACMDB corresponding with the matching stored identifying signature; and
    outputting, at the network port, the correlated first record to a CMDB-supported activity system.

2. The method of claim 1, further comprising, prior to transmitting the identifying rule set to the originating system, receiving via the network port a query from the originating system requesting the identifying rule set.

3. The method of claim 1, wherein the minimum amount of data specifies a plurality of parameters.

4. The method of claim 1, wherein the minimum amount of data specifies a subset of a plurality of parameters.

5. The method of claim 1, wherein the identifying rule set further defines a format for the minimum amount of data.

6. The method of claim 1, further comprising:
    receiving, from the originating system via the network port, a portion of data less than the minimum amount of data for a second record of the originating system that is defined as being necessary in order to generate a second identifying signature;
    creating, using the processor, based on the received portion of data for the second record and reference data, a remaining portion of data for the second record;
    generating, using the processor, based on the received portion of data for the second record and the remaining portion of data for the second record, the second identifying signature;
    matching, using the processor, the generated second identifying signature with a second matching stored identifying signature stored in the memory comprising the identification signature store;
    creating a correlated second record, using the processor, the second record of the originating system corresponding with the generated second identifying signature with a second CI record of the ACMDB corresponding with the second matching stored identifying signature; and
    outputting, at the network port, the correlated second record to the CMDB-supported activity system.

7. The method of claim 1, wherein the CMDB-supported activity system is a system for: change planning, service impact analysis, service optimization and automated remediation activities, proactive monitoring, proactive capacity management, proactive service optimization, service intelligence, or service health activities, or a combination thereof.

8. The method of claim 1, wherein:
the ACMDB implements domain separation; and
the identifying rule set includes at least one identifying rule applicable to a first domain and not applicable to a second domain.

9. The method of claim 1, wherein the originating system comprises:
an event monitoring system that contains event records, wherein each event record of the event records includes n-tuples of event properties,
a discovery system that collects information about devices or services within an environment,
an automated remediation system that performs healing or self-healing actions within the environment,
a configuration management system that can be configured to configure devices or services within the environment, or
a monitoring system that monitors the health of devices or services within the environment,
or a combination thereof.

10. The method of claim 1, wherein the first CI record contains manufacturer data, product name data, serial number data, MAC address data, computer name data, or a combination thereof.

11. The method of claim 1, wherein the identifying rule set comprises a definition of a mandatory data item.

12. A non-transitory computer-readable storage medium, comprising executable instructions that, when executed by a processor, facilitate performance of operations, comprising:
transmitting, to an originating system over a network via a network port connected to the network, an identifying rule set that defines a minimum amount of data in order to generate an identifying signature that serves as a common reference between a record of the originating system with a matching Configuration Item (CI) record of an Authoritative Configuration Management Database (ACMDB), wherein the originating system includes a plurality of records to be associated with a plurality of CI records in the ACMDB, and at least one CI record of the plurality of CI records comprises data related to a physical machine in an information technology system;
receiving, from the originating system via the network port, at least the minimum amount of data for a first record of the originating system that is defined as being necessary in order to generate the identifying signature;
generating, using the processor, based at least on the received minimum amount of data for the first record, a first identifying signature;
matching, using the processor, the generated first identifying signature with a first Matching stored identifying signature stored in a memory comprising an identification signature store comprising a plurality of stored identifying signatures that have been previously generated for a plurality of CI records of the ACMDB;
creating a correlated first record, using the processor, by correlating the first record of the originating system corresponding with the generated first identifying signature with a first CI record of the ACMDB corresponding with the matching stored identifying signature; and
outputting, at the network port, the correlated first record to a CMDB-supported activity system.

13. The non-transitory computer-readable storage medium of claim 12, wherein the operations further comprise:
prior to transmitting the identifying rule set to the originating system, receiving a query from the originating system for the identifying rule set.

14. The non-transitory computer-readable storage medium of claim 12, wherein the minimum amount of data specifies a plurality of parameters.

15. The non-transitory computer-readable storage medium of claim 12, wherein the minimum amount of data specifies a subset of a plurality of parameters.

16. The non-transitory computer-readable storage medium of claim 12, wherein the identifying rule set also define a format for the minimum amount of data.

17. The non-transitory computer-readable storage medium of claim 12, wherein the operations comprise:
receiving, from the originating system via the network port, a portion of data less than the minimum amount of data for a second record of the originating system that is defined as being necessary in order to generate a second identifying signature;
creating, using the processor, based on the received portion of data for the second record and reference data, a remaining portion of data for the second record;
generating, using the processor, based on the received portion of data for the second record and the remaining portion of data for the second record, the second identifying signature;
matching, using the processor, the generated second identifying signature with a second matching stored identifying signature stored in the memory comprising the identification signature store;
creating a correlated second record, using the processor, the second record of the originating system corresponding with the generated second identifying signature with a second CI record of the ACMDB corresponding with the second matching stored identifying signature; and
outputting, at the network port, the correlated second record to the CMDB-supported activity system.

* * * * *